US012010371B2

(12) United States Patent
Kikuchi et al.

(10) Patent No.: US 12,010,371 B2
(45) Date of Patent: Jun. 11, 2024

(54) INFORMATION PROCESSING APPARATUS, VIDEO DISTRIBUTION SYSTEM, INFORMATION PROCESSING METHOD, AND RECORDING MEDIUM

(71) Applicant: NEC Corporation, Tokyo (JP)

(72) Inventors: Katsumi Kikuchi, Tokyo (JP); Haruna Watanabe, Tokyo (JP); Yu Nabeto, Tokyo (JP); Soma Shiraishi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/923,935

(22) PCT Filed: May 18, 2020

(86) PCT No.: PCT/JP2020/019647
§ 371 (c)(1),
(2) Date: Nov. 8, 2022

(87) PCT Pub. No.: WO2021/234779
PCT Pub. Date: Nov. 25, 2021

(65) Prior Publication Data
US 2023/0179817 A1    Jun. 8, 2023

(51) Int. Cl.
*H04N 21/2668* (2011.01)
*H04N 21/239* (2011.01)
*H04N 21/845* (2011.01)

(52) U.S. Cl.
CPC ..... *H04N 21/2668* (2013.01); *H04N 21/2393* (2013.01); *H04N 21/8456* (2013.01)

(58) Field of Classification Search
CPC .......... H04N 21/2668; H04N 21/2393; H04N 21/8456; H04N 21/854; H04N 5/91; H04N 21/8549; G11B 27/031
See application file for complete search history.

(56) References Cited

U.S. PATENT DOCUMENTS

2008/0175486 A1 *   7/2008   Yamamoto ............... G06K 9/52

FOREIGN PATENT DOCUMENTS

| JP | 2005-107867 A | 4/2005 |
| JP | 2006-005725 A | 1/2006 |
| JP | 2006-054512 A | 2/2006 |
| JP | 2013-175854 A | 9/2013 |

OTHER PUBLICATIONS

International Search Report for PCT Application No. PCT/JP2020/019647, dated Jul. 21, 2020.

* cited by examiner

*Primary Examiner* — Anthony Bantamoi (57) ABSTRACT

An information processing apparatus generates structural information of a digest video from a video material. In the information processing apparatus, a video acquisition means acquires a video material. A condition acquisition means acquires a generation condition for generating the digest video from the creator. A generation means generates structural information indicating a structure of the digest video that is generated based on the video material based on the generation condition, and outputs the generated structural information.

10 Claims, 9 Drawing Sheets

<STRUCTURAL INFORMATION>

| VIDEO SEGMENT | DATA TO BE USED | TIME INFORMATION (TIME CODE) |
|---|---|---|
| 1 | video material 1.dat | 00:03:26:12~00:04:12:23 |
| 2 | rule video 2.dat | 00:00:00:01~00:00:31:25 |
| 3 | video material 1.dat | 00:10:42:31~00:12:42:13 |
| 4 | video material 1.dat | 00:22:34:16~00:24:12:08 |
| 5 | video material 1.dat | 00:34:32:15~00:35:52:03 |

INFORMATION PROCESSING APPARATUS, VIDEO DISTRIBUTION SYSTEM, INFORMATION PROCESSING METHOD, AND RECORDING MEDIUM

This application is a National Stage Entry of PCT/JP2020/019647 filed on May 18, 2020, the contents of all of which are incorporated herein by reference, in their entirety.

TECHNICAL FIELD

The present disclosure relates to processing of video data.

BACKGROUND ART

A device is known for editing video broadcasted from a broadcasting station according to a self-preference. For example, Patent Document 1 describes a video editing apparatus in that a user can designate a specific subject or the like in a frame image of a video broadcast from a broadcasting station, edit a composition of a video to be suitable for a preference of the user, and display and record the edited video.

PRECEDING TECHNICAL REFERENCES

Patent Document

Patent Document 1: Japanese Laid-open Patent Publication No. 2006-54512

SUMMARY

Problem to be Solved by the Invention

However, a technique of Patent Document 1, requires a user to display a video to be edited and designate an object of interest to the user, which is time-consuming to edit.

It is one object of the present disclosure to provide an information processing apparatus capable of generating a digest video meeting wishes of a viewer by providing information concerning properties and preferences of the viewer.

Means for Solving the Problem

According to an example aspect of the present disclosure, there is provided an information processing apparatus including:
a video acquisition means configured to acquire a video material;
a condition acquisition means configured to acquire a generation condition from a creator in order to generate a digest video; and
a generation means configured to generate structural information indicating a structure of the digest video which is generated from the video materials based on the generation condition.

According to another example aspect of the present disclosure, there is provided an information processing method including:
acquiring a video material;
acquiring a generation condition from a creator in order to generate a digest video; and
generating structural information indicating a structure of the digest video which is generated from the video materials based on the generation condition.

According to still another example aspect of the present disclosure, there is provided a recording medium storing a program, the program causing a computer to perform a process including:
acquiring a video material;
acquiring a generation condition from a creator in order to generate a digest video; and
generating structural information indicating a structure of the digest video which is generated from the video materials based on the generation condition.

Effect of the Invention

According to the present disclosure, it becomes possible to generate a digest video that meets a desire of a viewer.

EXAMPLE EMBODIMENTS

In the following, example embodiments will be described with reference to the accompanying drawings.

First Example Embodiment

[Basic Configuration]

Figure 1:
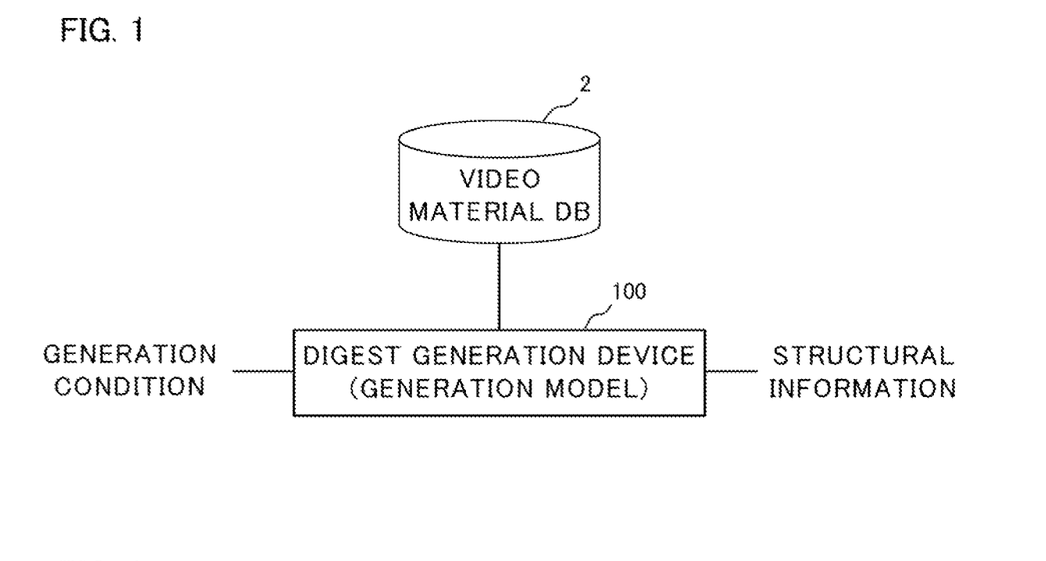
FIG. 1 illustrates a digest generation device according to a first example embodiment.

FIG. 1 illustrates a digest generation device 100 according to a first example embodiment. The digest generation device 100 is connected to a video material database (hereinafter, a "database" is also referred to as a "DB") 2. The video material DB 2 stores various video materials, that is, various footages. The video material may be, for instance, a video such as a television program broadcasted from a broadcasting station, and may be a video that is distributed on the Internet or the like. Note that the video material may or may not include sound.

A generation condition for generating a digest video is input to the digest generation device 100. The generation condition corresponds to information which indicates features and a tendency of the digest video desired by a creator. In detail, the following generation conditions can be mentioned.

(1) Properties of the Creator

A gender, an age, a residential area, a nationality, a family composition, information of following/followers on a SNS (Social Network Service) and the like of the creator.

(2) Subjects of Attention by the Creator

Subjects that the creator is interested in. For instance, a team or a player that the creator supports in a case where the video material is a sports video. Actors that the creator likes in a case where the video material is a TV drama or a movie, and the like.

(3) Time Zone During which the Creator Views a Digest Video

Morning, noon, evening, night, or the like.

(4) Viewing Time Width (Length of a Digest Video)

5 minutes, 30 minutes, 60 minutes, or the like.

(5) Duration of the Video Material to be Used

Video materials for the day, video materials for one week up to the day, video materials for Year 2020, or the like.

The digest generation device 100 designs a structure of the digest video using a part of the video material stored in the video material DB 2 based on the input generation condition, and outputs structural information of the digest video. Although details will be described later, the structural information corresponds to information that indicates a plurality of footages included in the digest video in a time series. Incidentally, the digest generation device 100 outputs the structural information necessary for reproducing the digest video rather than outputting the digest video itself including sets of footage data of individual scenes. The digest generation device 100 generates the structural information of the digest video using a digest generation model (hereinafter, simply referred to as a "generation model") trained by machine learning. The generation model is, for instance, a model using a neural network.

[Hardware Configuration]

Figure 2:
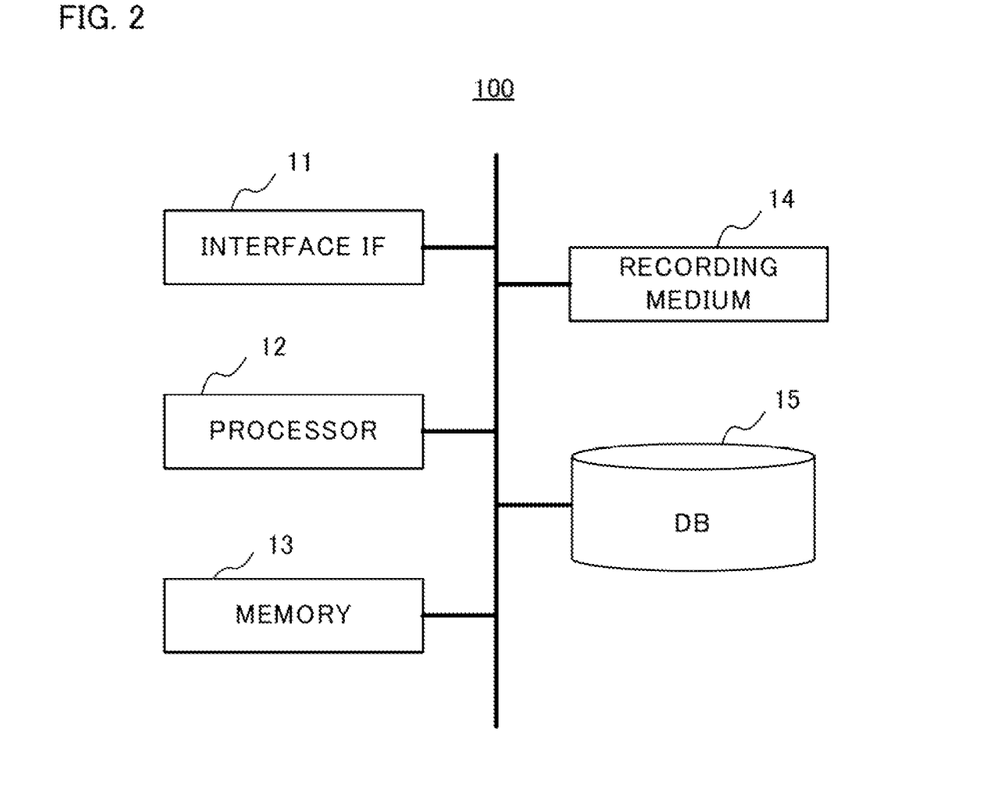
FIG. 2 is a block diagram illustrating a hardware configuration of a digest generation device.

FIG. 2 is a block diagram illustrating a hardware configuration of the digest generation device 100. As illustrated, the digest generation device 100 includes an interface (IF) 11, a processor 12, a memory 13, a recording medium 14, and a database (DB) 15.

The IF 11 inputs and outputs data to and from an external device. Specifically, the generation condition of the digest video by the creator is input to the digest generation device 100 via the IF 11. The video material stored in the video material DB 2 is also input to the digest generation device 100 via the IF 11. The structural information generated by the digest generation device 100 is output to the external device through the IF 11.

The processor 12 is a computer such as a CPU (Central Processing Unit), and controls the entire digest generation device 100 by executing programs prepared in advance. Specifically, the processor 12 executes a structural information generation process and a training process which will be described later.

The memory 13 is formed by a ROM (Read Only Memory), a RAM (Random Access Memory), and the like. The memory 13 is also used as a working memory during executions of various processes by the processor 12.

The recording medium 14 is a non-volatile and non-transitory recording medium such as a disk-shaped recording medium, a semiconductor memory, or the like, and is formed to be detachable from the digest generation device 100. The recording medium 14 records various programs executed by the processor 12. When the digest generation device 100 executes various kinds of processes, programs recorded on the recording medium 14 are loaded into the memory 13 and executed by the processor 12.

The database 15 stores the generation condition and the video material input through the IF 11, the structural information generated by the digest generation device 100, and the like. The database 15 also stores information on the trained generation model used by the digest generation device 100, and the training data to be used for training the generation model. Incidentally, the digest generation device 100 may include a keyboard, an input unit such as a mouse, and a display unit such as a liquid crystal display for the creator to perform instructions and inputs.

[Functional Configuration]

Figure 3:
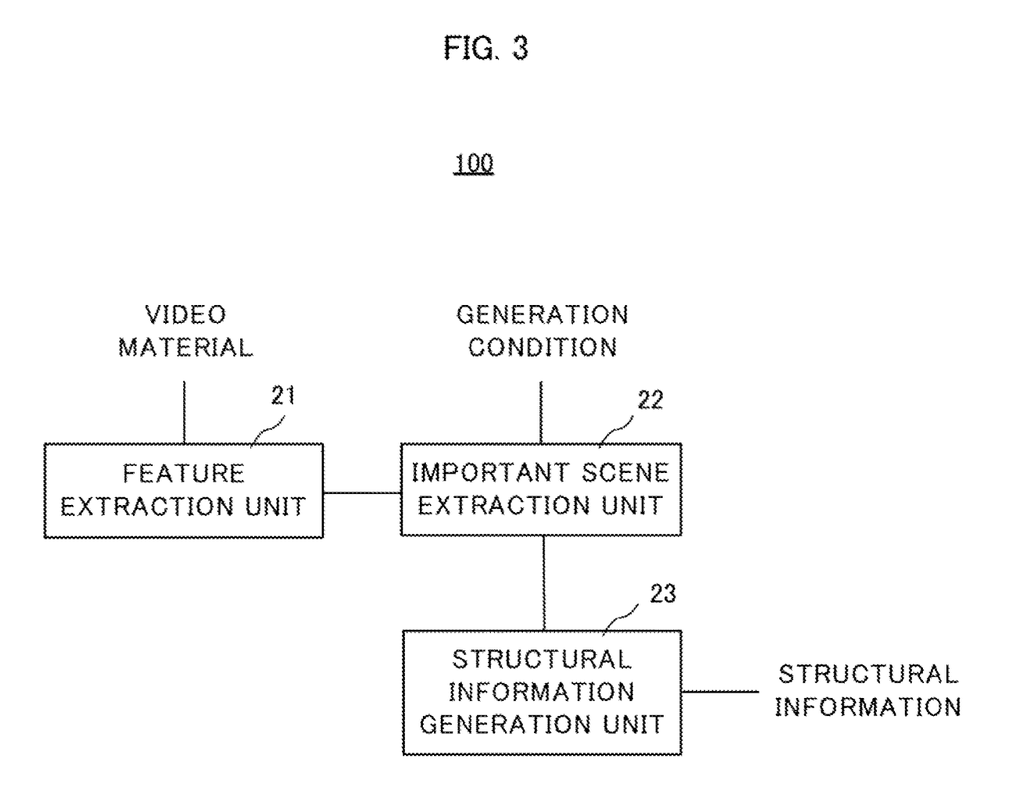
FIG. 3 is a block diagram illustrating a functional configuration of the digest generation device.

FIG. 3 is a block diagram illustrating a functional configuration of the digest generation device 100. The digest generation device 100 includes a feature extraction unit 21, an important scene extraction unit 22, and a structural information generation unit 23. In practice, the digest generation device 100 generates structural information by performing an inference using the generation model having these functions.

The feature extraction unit 21 extracts features from the video material acquired from the video material DB 2. The features may correspond to a set of features for each frame image forming a video material, and may correspond to a set of features every predetermined number of frame images. Although various techniques exist as techniques for extracting features from a video, a technique of for extracting the features in this example embodiment is not limited to a specific technique, and any one of the techniques can be used. The feature extraction unit 21 outputs the extracted features to the important scene extraction unit 22. The feature extraction unit 21 corresponds to an example of a video acquisition means.

Figure 4:
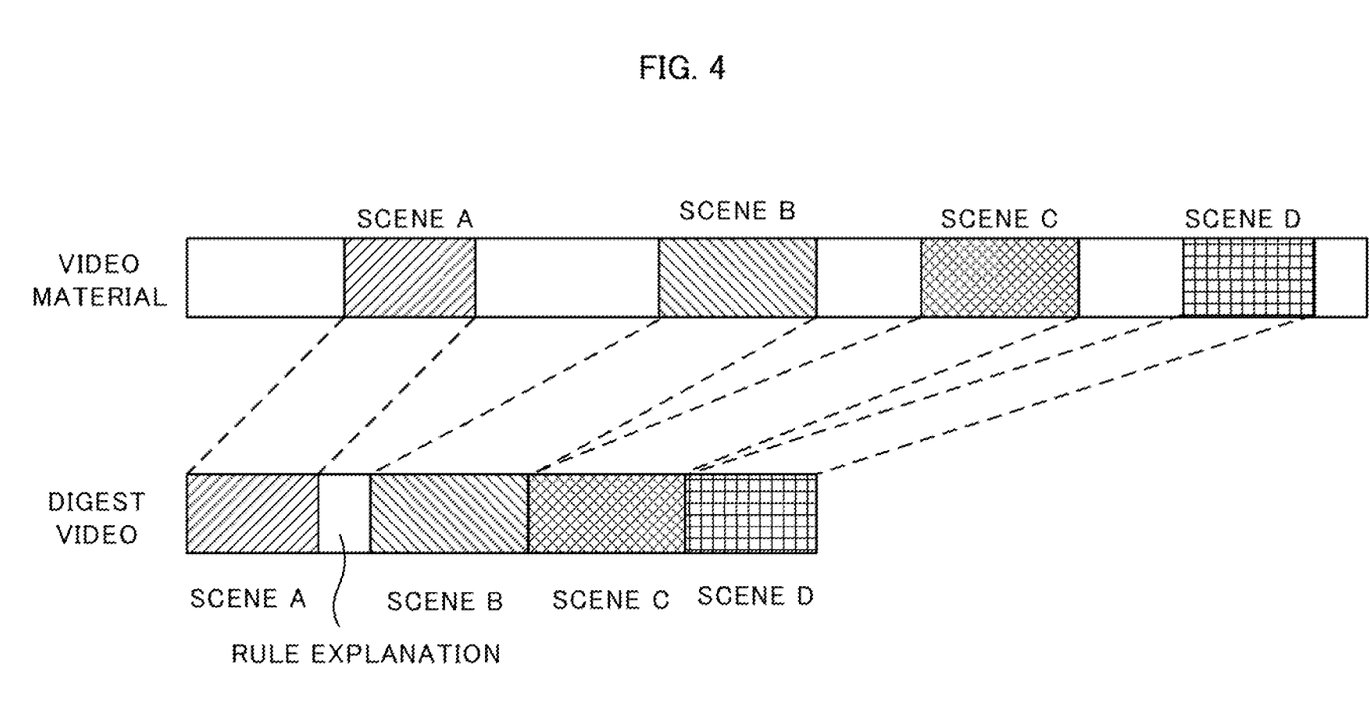
FIG. 4 schematically illustrates an example for extracting an important scene from a video material.

The important scene extraction unit 22 extracts a plurality of scenes from the video material based on the features extracted by the feature extraction unit 21 to determine the importance of each scene, and selects a scene having a high degree of importance as an important scene. The degree of importance for each scene is obtained, for instance, as an importance score. FIG. 4 schematically illustrates an example of extracting the important scene from the video material. In a case where there is the video material, the important scene extraction unit 22 determines a degree of importance for each scene based on the features in the plurality of scenes in the video material, and extracts a scene in which the importance score is equal to or higher than a predetermined threshold value as the important scene. In the example in FIG. 4, the important scene extraction unit 22 extracts scenes A through D in the video material as important scenes. The extracted important scenes A through D are used as parts of the digest video. The important scene extraction unit 22 corresponds to an example of a condition acquisition means.

Here, the important scene extraction unit 22 extracts a scene having high relevance to items indicated by the generation condition as an important scene among a plurality of the extracted scenes. In detail, the important scene extraction unit 22 calculates an importance score by evaluating features in the individual scenes in terms of the items indicated by the generation condition, compares this importance score with a predetermined threshold value, and extracts the important scene. For instance, the important scene extraction unit 22 extracts, as the important scene, a scene with a content that is highly interesting to viewers of the same gender or the same age based on the gender and the age of the creator included in the generation condition. In addition, the important scene extraction unit 22 extracts a scene in which a person of the same nationality as the creator or an area close to a residential area of the creator appears as the important scene, or extracts a scene in which a child appears in a case where a child is included in the family composition of the creator as the important scene. In addition, in a case where the video material is a sports match, the important scene extraction unit 22 extracts as an important scene the team or the scene in which the player cheers. In this manner, the important scene extraction unit 22 extracts important scenes based on the generation conditions so that scenes close to a desire of the creator are included. The important scene extraction unit 22 outputs important scene information indicating the extracted important scene to the structural information generation unit 23. Here, the important scene information includes a data name indicating a video material and time information such as a time code of the important scene in the video material.

As a specific example, in a case where the material video is a video of a live sports broadcast, the important scene extraction unit 22 extracts, as important scenes, a scoring scene, a come-from-behind scene, a scene in which a score is expected such as a baseball full base or before a soccer goal, a scene of a hit by pitch in a baseball, a scene of a fine save of a keeper in a soccer, a scene of a half-time show, a scene of an interview to a player, and the like.

The structural information generation unit 23 corresponds to an example of a generation means, and generates structural information indicating a structure of the digest video formed by the extracted important scenes. In detail, the structural information generation unit 23 generates structural information by connecting pieces of important scene information corresponding to a plurality of important scenes which are input from the important scene extraction unit 22 in a time series. For instance, in a case where the video material is a live baseball game, the structural information generation unit 23 designs a digest video that connects a series of scenes: such as "a pitcher stands up"→, "a batter stands up"→"both stare at each other"→"the pitcher throws"→"the batter hits"→"the pitcher looks up"→"the batted ball enters a stand" →"the batter makes a base run over the pitcher" and the like, and generates the structural information for the digest video.

Moreover, the structural information generation unit 23 may include related videos concerning individual important scenes in the digest video. The related videos include previous videos related to the important scene, videos related to subjects appearing in the important scenes, commentary videos related to the important scenes, and the like. For instance, in a case where the video material is the live sports broadcast, the previous videos related to the important scenes are videos of previous matches of the same card as the video material, or the like, and the information concerning each subject appearing in the important scenes corresponds to a video such as a profile, an achievement, or the like related to the player appearing in the video material. In addition, each of the commentary videos related to the important scenes is, for instance, a video of an explanation of a sports rule. Furthermore, the structural information generation unit 23 may add processing data such as text, a subtitle, and a sound effect to each important scene or each related footage included in the digest video.

Figure 5:
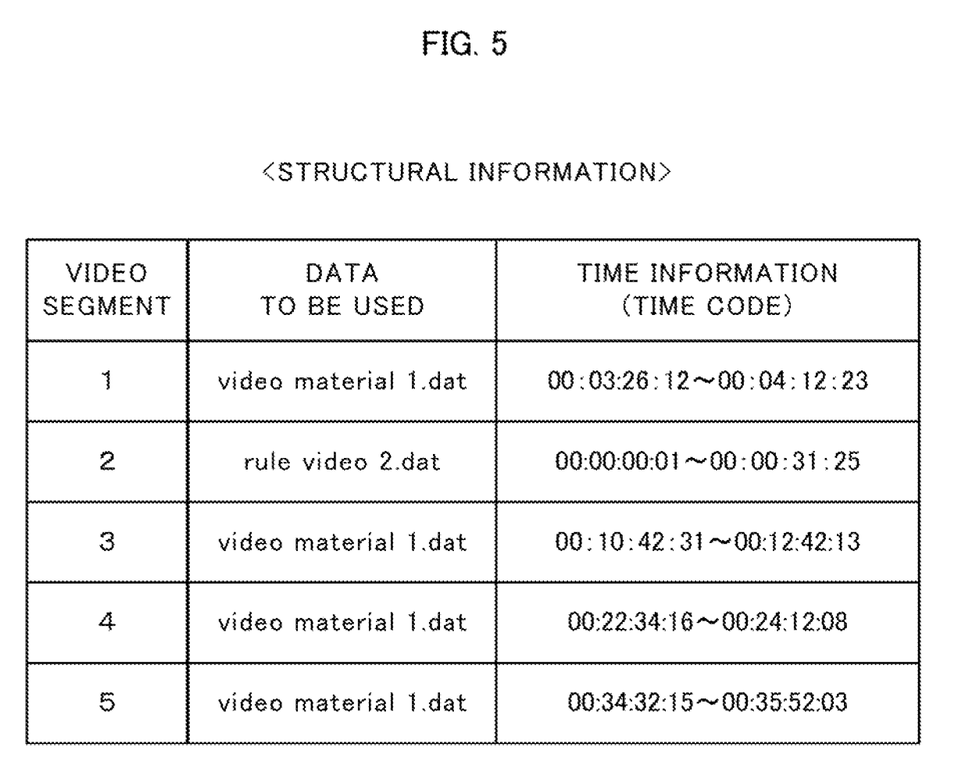
FIG. 5 illustrates structural information of a digest video depicted in FIG. 4.

FIG. 5 illustrates an example of the structural information. FIG. 5 illustrates the structural information of the digest video depicted in FIG. 4. The digest video illustrated in FIG. 4 includes a scene A, a scene B, a scene C, and a scene D which are the video materials in this order, and a rule explanation is inserted between the scene A and the scene B. FIG. 5 illustrates the structural information of this digest video. A "video segment" indicates each number assigned in a time series to a plurality of individual video segments forming the digest video. A video segment 1 corresponds to the scene A in the video material, a video segment 2 corresponds to the rule explanation, a video segment 3 corresponds to the scene B in the video material, a video segment 4 corresponds to the scene C in the video material, a video segment 5 corresponds to the scene D in the video material. "Data to be used" designate video data to be used in reproducing the digest video, and indicate a data name of the video material illustrated in FIG. 4 in this example. A "time information" indicates time (a time code) of the data to be used and reproduced in each video segment. For instance, the video segment 1 of the digest video indicates that a segment of a time code "00:03:26:12 to 00:04:12:23" of a "video material 1.dat" is played. The data to be used and the time information are included in the important scene information output by the important scene extraction unit 22. In this manner, the structural information generation unit 23 designs the digest video including the important scenes extracted by the important scene extraction unit 22 and the related videos added as necessary, and outputs the structural information of the digest video. Note that the structural information indicates a structure of the digest video as described above, and the structural information generation unit 23 does not include video data included in the digest video.

[Structural Information Generation Process]

Figure 6:
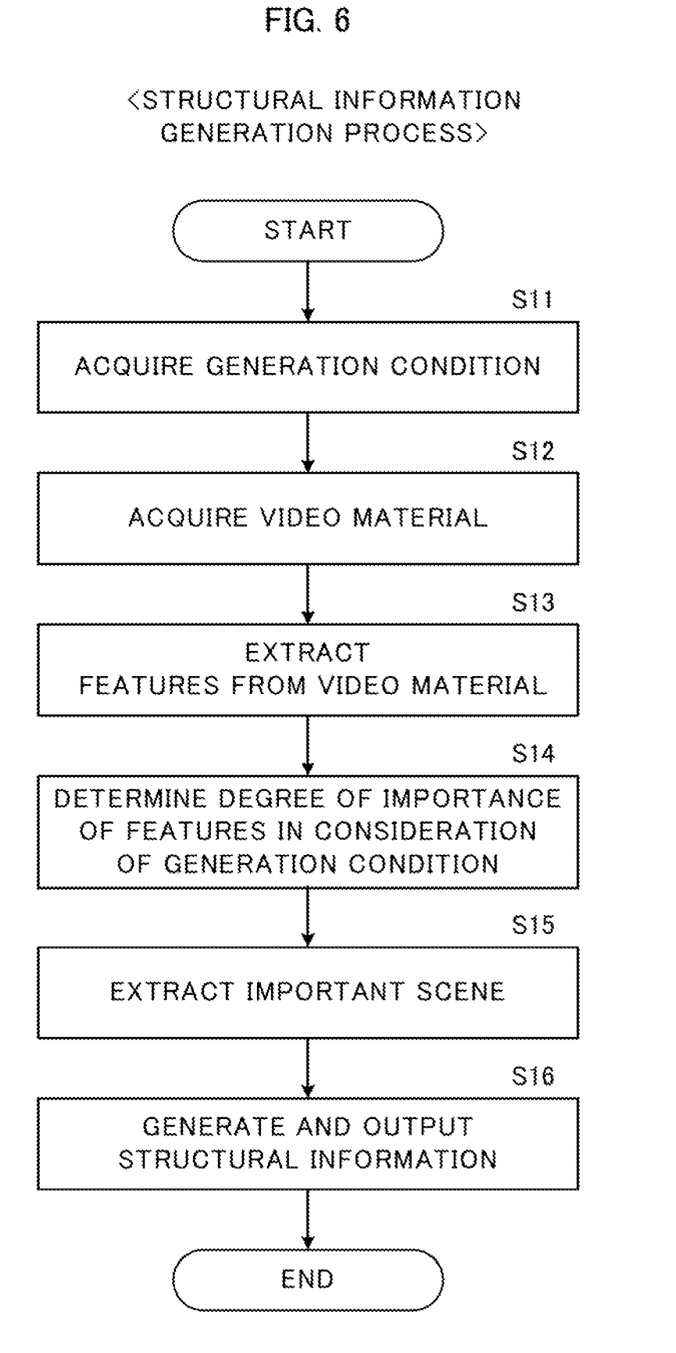
FIG. 6 is a flowchart of a structural information generation process.

FIG. 6 is a flowchart of the structural information generation process executed by the digest generation device 100. This process is implemented by the processor 12 illustrated in FIG. 2, which executes a program prepared in advance.

First, the digest generation device 100 acquires generation condition related to a creator (step S11). In detail, the digest generation device 100 may acquire the generation condition input by the creator using an input device or the like, or may read the generation condition of the creator stored in advance based on an input such as an ID of the creator. Next, the digest generation device 100 acquires the video material from the video material DB 2 (step S12). Typically, since a target video material is specified by the creator, and the digest generation device 100 acquires the video material specified by the creator.

Next, the feature extraction unit 21 of the digest generation device 100 extracts features from the video material (step S13). Next, based on the features in a plurality of scenes in the video material, the important scene extraction unit 22 determines a degree of importance for each scene considering items included in the generation condition (step S14), and extracts each scene in which an importance score is equal to or higher than a predetermined threshold value as the important scene (step S15). Next, the structural information generation unit 23 connects important scenes in a time series, and designs the digest video by additionally providing the related videos and processing data as required, and outputs the structural information of the digest video (step S16). After that, the structural information generation process is terminated.

[Training of the Generation Model]

Figure 7:
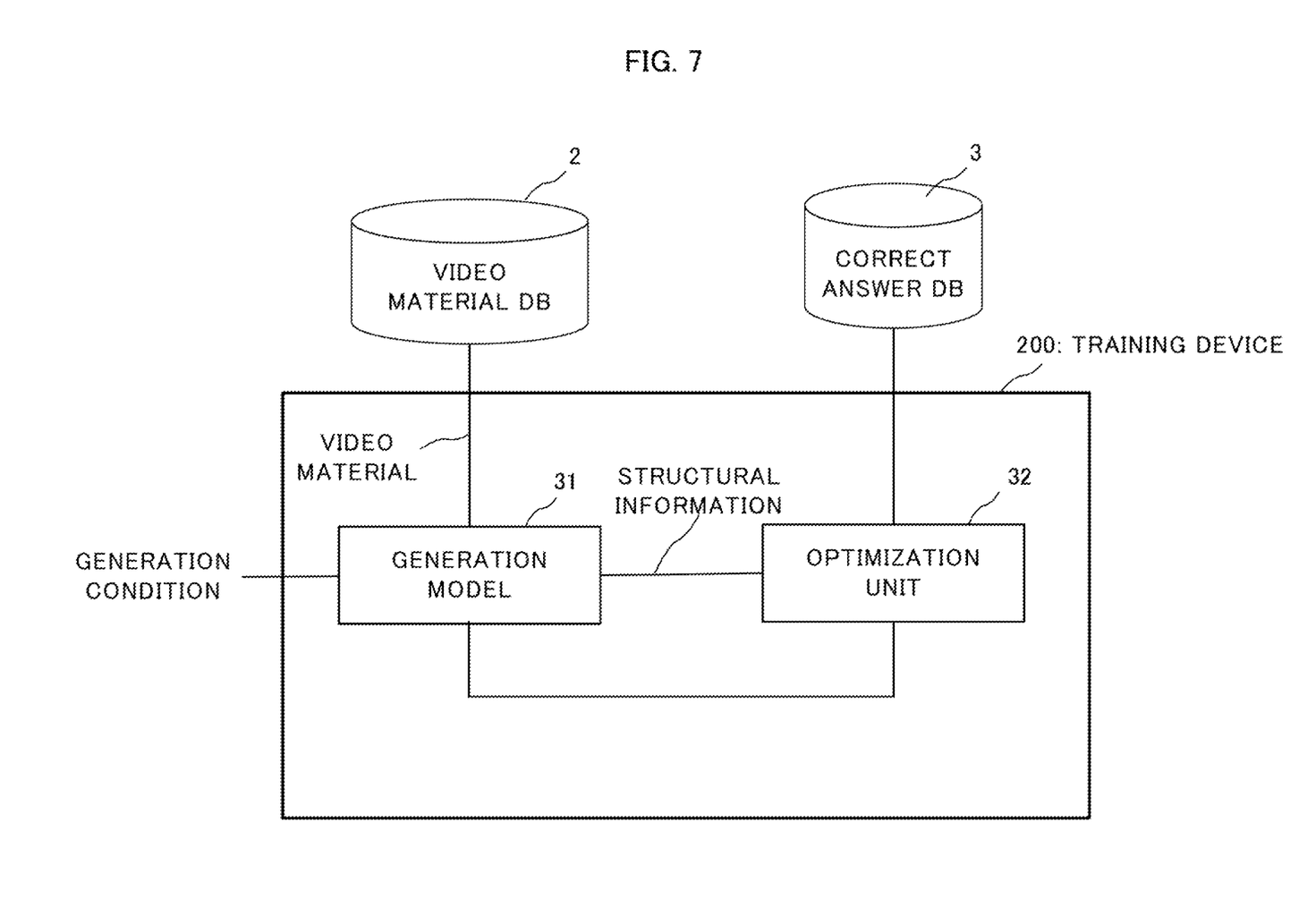
FIG. 7 is a block diagram illustrating a structure of a training device that trains a generation model.

Next, training of the generation model used by the digest generation device 100 will be described. FIG. 7 is a block diagram illustrating a configuration of a training device 200 for training the generation model. The training device 200 includes a generation model 31 and an optimization unit 32. A hardware configuration of the training device 200 is the same as that depicted in FIG. 2. At a time of training of the generation model 31, in addition to the video material DB 2 in which the video material is stored, a correct answer DB 3 in which correct answer data are stored is prepared. The correct answer data are used for the training of the generation model 31, and correspond to the data indicating a correct answer of the structural information generated by the generation model 31 in response to inputs of the video material for training (hereinafter referred to as a "training video material") and the generation condition for training (hereinafter referred to as a "training generation condition"). The correct answer data are prepared in advance for each combination of the training video material and the training generation condition. That is to say, the training data used for the training are a set of training video material, the training generation condition, and the correct answer data. For instance, in a case where a baseball broadcast is used as the training video material and information of teams and players participating in a match is used as the training generation condition, the structural information of the digest video, which is obtained by extracting scenes in which the team and the players appear from the video material, is prepared as the correct answer data. In addition, in a case where a TV drama is used as the training video material and an actor being a hero is specified as the training generation condition, the structural information of the digest video acquired by extracting the scene in which the actor appears from the video material is prepared as the correct answer data.

At a time of training, the training generation condition and the training video material, which correspond to the correct answer data prepared in advance, are input to the generation model 31. The generation model 31 extracts each important scene from the training video material to design the digest video based on the training generation condition, and outputs structural information of the digest video to the optimization unit 32. The optimization unit 32 acquires the correct answer data prepared for the training generation condition and the training video material from the correct answer DB 3, calculates a loss by comparing the acquired correct answer data with the structural information obtained from the generation model 31, and optimizes the generation model 31 based on the calculated loss. Specifically, the optimization unit 32 updates parameters of the neural network forming the generation model so that the calculated loss is reduced. Accordingly, it becomes possible to the trained generation model 31 to output structural information of the designed digest video by extracting each important scene according to the generation condition from the video material.

Figure 8:
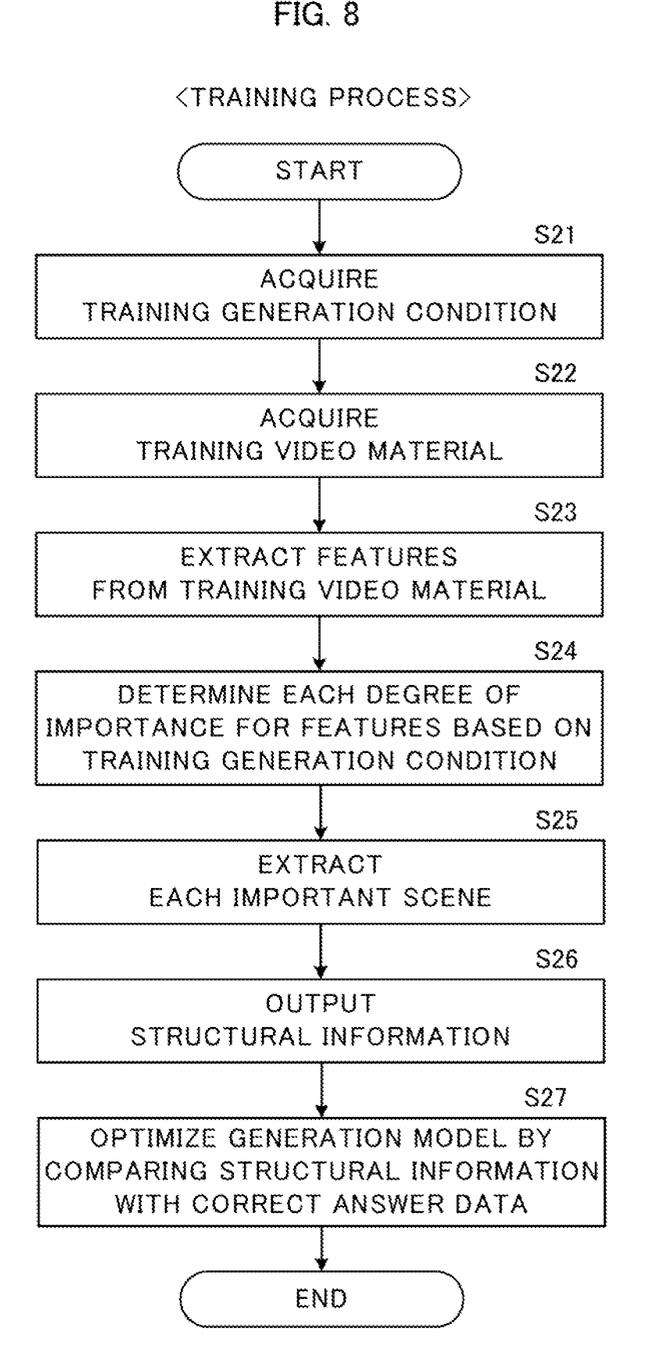
FIG. 8 is a flowchart of a training process of the generation model.

FIG. 8 is a flowchart of the training process. This process is realized by the processor 12 illustrated in FIG. 2, which executes a program prepared in advance. First, the training device 200 acquires the training generation condition (step S21) and also acquires the training video material from the video material DB 2 (step S22). Next, the generation model 31 extracts the features from the training video material (step S23), determines each degree of importance for the features based on the training generation condition (step S24), and extracts each important scene (step S25).

Next, the generation model 31 designs the digest video by connecting the extracted important scenes, and outputs the structural information of the digest video to the optimization unit 32 (step S26). The optimization unit 32 calculates a loss by comparing the input structural information with the correct answer data stored in the correct answer DB 3, and optimizes the generation model 31 based on the loss (step S27). The above process is executed by a number of sets of training data prepared in advance, and then, the training process is terminated.

[Use of Structural Information]

Figure 9:
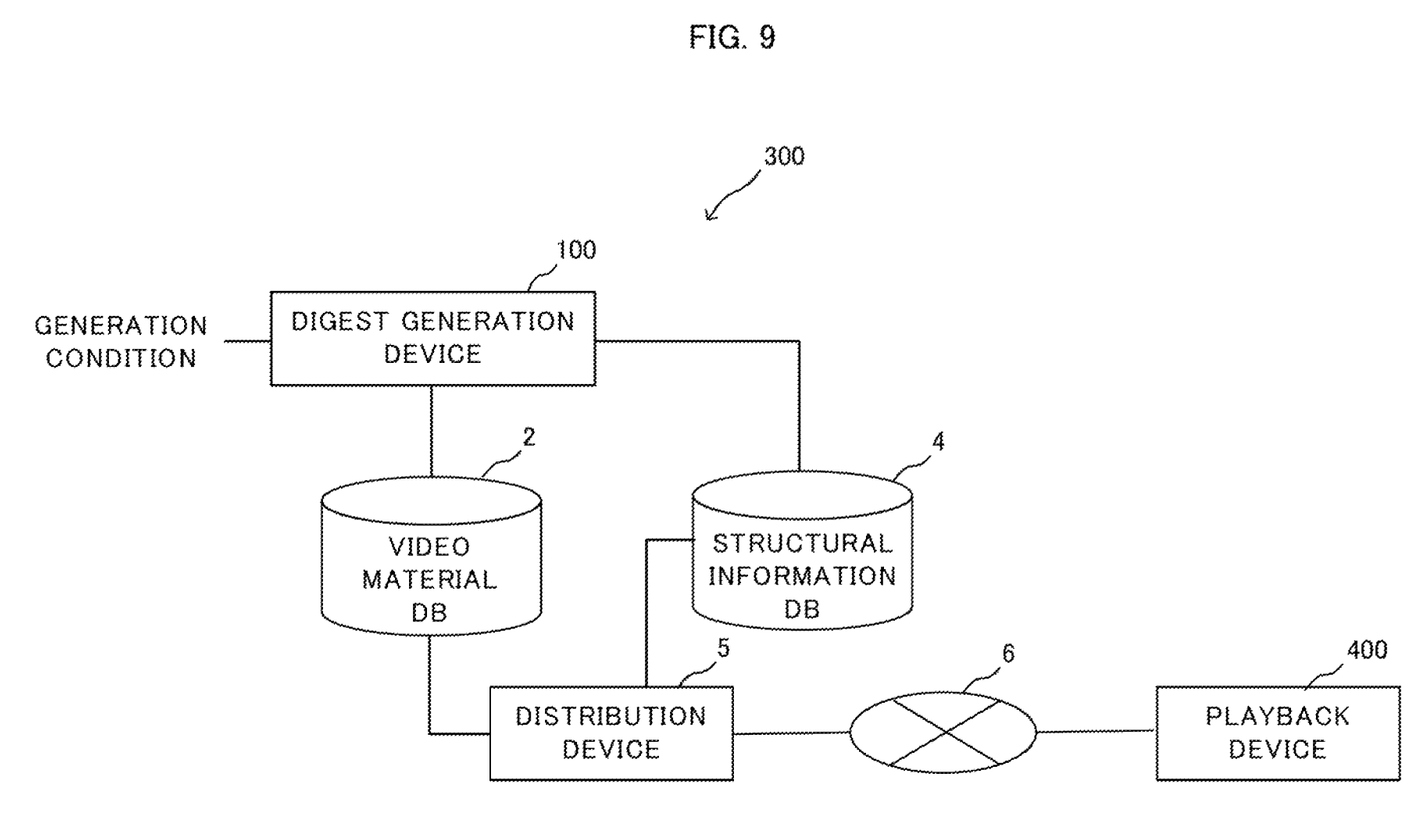
FIG. 9 is a block diagram illustrating a schematical configuration of a distribution system of the digest video.

Next, a use of the structural information generated by the digest generation device 100 will be described. FIG. 9 is a block diagram illustrating a schematic configuration of a system (hereinafter, referred to as a "distribution system") for distributing a digest video based on structural information 300. The distribution system 300 includes a digest generation device 100, a video material DB 2, a structural information DB 4, and a distribution device 5. The distribution system 300 is connected to a playback device 400 of a viewer via a network 6.

The structural information generated by the digest generation device 100 is stored in the structural information DB 4. In the structural information DB 4, for each piece of the structural information, an ID of the creator of the structural information and attached information such as a property, a hobby, and a preference of the creator are stored. The playback device 400 is used by the viewer viewing the digest video by utilizing the structural information stored in the structural information DB 4.

In detail, the viewer operates the playback device 400 to specify the condition of the desired digest video and to request the structural information to the distribution device 5. The distribution device 5 transmits the structural information matching a condition specified by the viewer to the playback device 400. The viewer carries out a playback instruction to the distribution device 5 based on the received structural information. The distribution device 5 sequentially distributes corresponding portions of a corresponding video material to the playback device 400 in accordance with the playback instruction received from the playback device 400. In this method, the distribution device 5 transmits the structural information to the playback device 400, but does not provide the video material itself to the playback device 400. Therefore, it is possible to prevent the video material from being distributed and protect a right of the video material.

For instance, in a case where the viewer desires to watch a digest video created by a particular creator, the viewer can request the structural information by specifying the ID, a name, a handle name, and the like of the creator. As a result, for instance, the viewer can watch a digest video created by a famous baseball commentator or a famous baseball fan in a case of viewing the digest video of a baseball game. In addition, the viewer can view digest videos created by people who are in an environment similar to that of the viewer or by people who have common hobbies by specifying their own properties (an age, a gender, a family composition, and the like), a hobby, a preference, or the like.

Moreover, in the above-described distribution system, by forming the structural information so as to include a scene of the video material existing at a different location, it is possible to realize the digest video using videos and archives possessed by different broadcasting stations. For instance, in a case where a winning team is determined based on results of two games broadcasted by different broadcasting stations, it is possible to generate a digest video that combines important scenes of those two games.

[Modification]

(Modification 1)

In the above example, the digest generation device 100 generates the structural information based on the generation condition acquired from one creator, but may generate the structural information based on the generation conditions acquired from a plurality of creators. For instance, in a case where a game broadcast of a certain baseball team is used as a video material, generation conditions acquired from a plurality of persons that are fans of the team may be combined and used, and structural information may be generated by designing a digest video. In addition, in a case where a game broadcast, in which baseball teams A and B play against each other, is used as a video material, generation conditions obtained from respective fans of the baseball team A and the baseball team B may be used in combination, and generates structural information.

(Modification 2)

In a case where a plurality of pieces of the structural information using the same video material is created, the digest generation device 100 may re-form the structural information by combining those pieces of the structural information. By re-forming the structural information, it is possible to create a digest video which includes scenes extracted from various viewpoints, such as adults and children, males and females, couples and families, and the like for video materials related to the same event (that is, videos of fireworks events, videos of sports day, or the like).

Second Example Embodiment

Figure 10:
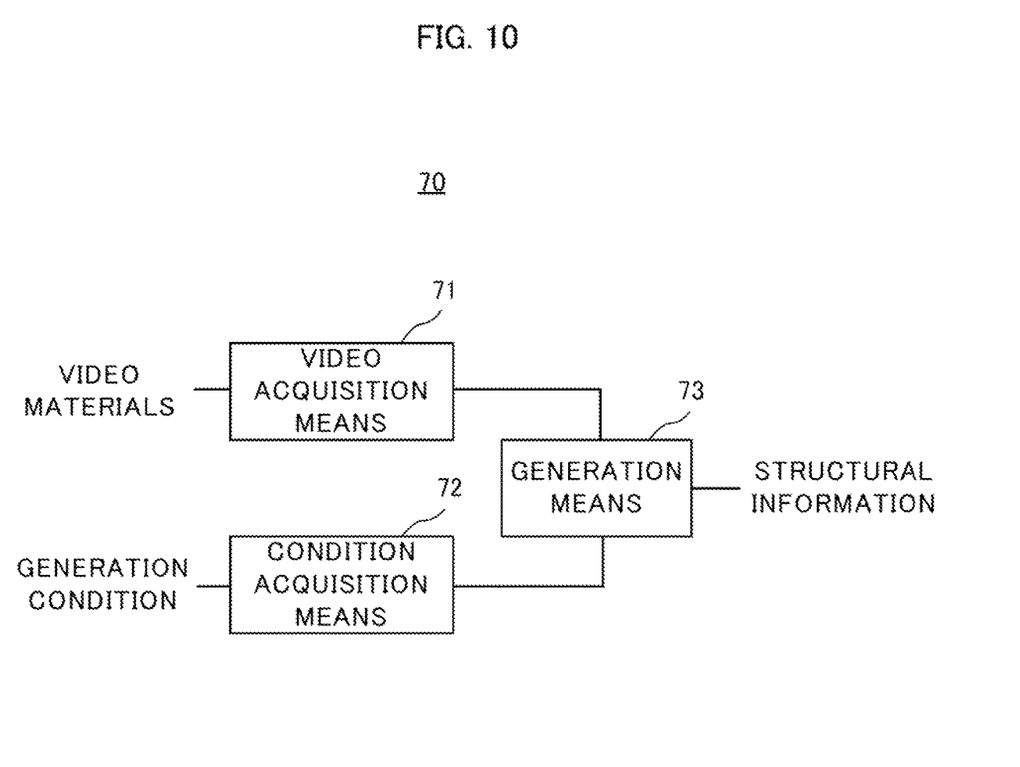
FIG. 10 is a block diagram illustrating a functional configuration of an information processing apparatus according to a second example embodiment.

Next, a second example embodiment of the present invention will be described. FIG. 10 is a block diagram illustrating a functional configuration of an information processing apparatus according to a second example embodiment. As illustrated, an information processing apparatus 70 includes a video acquisition means 71, a condition acquisition means 72, and a generation means 73. The image acquisition means 71 acquires a video material. The condition acquisition means 72 acquires a generation condition for generating a digest video from a creator. The generation means 73 generates and outputs structural information indicating a structure of the digest video generated from the video material based on the generation condition.

A part or all of the example embodiments described above may also be described as the following supplementary notes, but not limited thereto.

(Supplementary Note 1)

1. An information processing apparatus comprising:
a video acquisition means configured to acquire a video material;
a condition acquisition means configured to acquire a generation condition from a creator in order to generate a digest video; and
a generation means configured to generate structural information indicating a structure of the digest video which is generated from the video materials based on the generation condition, and output the generated structural information.

(Supplementary Note 2)

2. The information processing apparatus according to supplementary note 1, wherein the generation condition indicates at least one of properties of the creator, a length of the digest video, and information specifying a subject to be included in the digest video.

(Supplementary Note 3)

3. The information processing apparatus according to supplementary note 1 or 2, wherein the generation condition includes at least one of a time zone during which a viewer views the digest video and date and time when the material video used to generate the digest video was generated.

(Supplementary Note 4)

4. The information processing apparatus according to any one of supplementary notes 1 through 3, wherein
the generation means extracts a plurality of important scenes from the video material based on the generation condition; and
the structural information includes information indicating videos of the plurality of important scenes being extracted.

(Supplementary Note 5)

5. The information processing apparatus according to supplementary note 4, wherein the generation means extracts features for each of a plurality of scenes included in the video material, calculates a score of importance of the features based on the generation condition, and extracts each scene, which has the score of importance exceeding a predetermined threshold, as the important scene.

(Supplementary Note 6)

6. The information processing apparatus according to supplementary note 4 or 5, wherein
the structural information includes information indicating each related video that is related to the important scene; and
the structural information includes at least one of a previous video related to the important scene, a video related to a subject appearing in the important scene, and a commentary video related to the important scene.

(Supplementary Note 7)

7. The information processing apparatus according to supplementary notes 1 through 6, wherein
the condition acquisition means acquires respective generation conditions from a plurality of creators; and
the generation means generates the structural information based on the respective generation conditions acquired from the plurality of creators.

(Supplementary Note 8)

8. A video distribution system comprising:
an information processing apparatus according to any one of claims 1 through 7;
a structural information database configured to store the structural information generated by the information processing apparatus;
a video material database configured to store the video material; and
a distribution device configured to distribute the digest video,
wherein the distribution device
acquiring structural information being requested when receiving a request of the structural information from a playback device and sending the acquired structural information to the playback device; and
acquiring a video of an important scene included in the structural information when receiving a playback request indicating the structural information from the playback device, and sending the acquired video to the playback device.

(Supplementary Note 9)

9. An information processing method, comprising:
acquiring a video material;
acquiring a generation condition from a creator in order to generate a digest video; and
generating structural information indicating a structure of the digest video which is generated from the video materials based on the generation condition, and outing the generated structural information.

(Supplementary Note 10)

10. A recording medium storing a program, the program causing a computer to perform a process comprising:
acquiring a video material;
acquiring a generation condition from a creator in order to generate a digest video; and
generating structural information indicating a structure of the digest video which is generated from the video materials based on the generation condition, and outing the generated structural information.

While the disclosure has been described with reference to the example embodiments and examples, the disclosure is not limited to the above example embodiments and examples. Various changes which can be understood by those skilled in the art within the scope of the present invention can be made in the configuration and details of the present invention.

DESCRIPTION OF SYMBOLS

2 Video material DB
3 Correct answer DB
4 Structural information DB
5 Distribution apparatus
12 Processor
13 Memory
15 Database (DB)
21 Feature extraction unit
22 Important scene extraction unit
23 Structural information generation unit
31 Generation model
32 Optimization unit
100 Digest generation device
200 Training device
300 Distribution system
400 Playback device

What is claimed is:

1. An information processing apparatus comprising:
a memory storing instructions; and
one or more processors configured to execute the instructions to:
acquire a video material;
acquire a generation condition from a creator in order to generate a digest video;
generate structural information indicating a structure of the digest video which is generated from the video material based on the generation condition, and store the generated structural information and attached information concerning the creator in a database; and
acquire, upon receiving a request for the structural information indicating at least a portion of the attached information, the structural information corresponding to the portion of the attached information from the database, and send the acquired structural information to a request originator.

2. The information processing apparatus according to claim 1, wherein the generation condition indicates at least one of attributes of the creator, a length of the digest video, and information specifying a subject to be included in the digest video.

3. The information processing apparatus according to claim 1, wherein the generation condition includes at least one of a time zone during which a viewer views the digest video and a date and time when the material video used to generate the digest video was generated.

4. The information processing apparatus according to claim 1, wherein
the processor extracts a plurality of important scenes from the video material based on the generation condition; and
the structural information includes information indicating videos of the plurality of important scenes being extracted.

5. The information processing apparatus according to claim 4, wherein the processor extracts features for each of a plurality of scenes included in the video material, calculates a score of importance of the features based on the generation condition, and extracts each scene for which the score of importance exceeding a predetermined threshold, as one of the important scenes.

6. The information processing apparatus according to claim 4, wherein
the structural information includes information indicating each related video that is related to the important scenes; and
the structural information includes at least one of a previous video related to the important scenes, a video related to a subject appearing in the important scenes, and a commentary video related to the important scenes.

7. The information processing apparatus according to claim 1, wherein
the processor acquires respective generation conditions from a plurality of creators; and
the processor generates the structural information based on the respective generation conditions acquired from the plurality of creators.

8. A video distribution system comprising:
the information processing apparatus according to claim 1;
the database configured to store the structural information generated by the information processing apparatus;
a video material database configured to store the video material; and
a distribution device configured to distribute the digest video,
wherein the distribution device
acquiring, from the database, the structural information being requested when receiving a request of the structural information from a playback device and sending the acquired structural information to the playback device; and
acquiring a video of an important scene included in the structural information when receiving a playback request indicating the structural information from the playback device, and sending the acquired video to the playback device.

9. An information processing method performed by a computer and comprising:
acquiring a video material;
acquiring a generation condition from a creator in order to generate a digest video;
generating structural information indicating a structure of the digest video which is generated from the video material based on the generation condition, and storing the generated structural information and attached information concerning the creator in a database; and
acquiring, upon receiving a request for the structural information indicating at least a portion of the attached information, the structural information corresponding to the portion of the attached information from the database, and sending the acquired structural information to a request originator.

10. A non-transitory computer-readable recording medium storing a program, the program causing a computer to perform a process comprising:
    acquiring a video material;
    acquiring a generation condition from a creator in order to generate a digest video;
    generating structural information indicating a structure of the digest video which is generated from the video material based on the generation condition, and storing the generated structural information and attached information concerning the creator in a database; and
    acquiring, upon receiving a request for the structural information indicating at least a portion of the attached information, the structural information corresponding to the portion of the attached information from the database, and sending the acquired structural information to a request originator.

\* \* \* \* \*